(12) United States Patent
Rahman (10) Patent No.: US 12,207,340 B2
(45) Date of Patent: Jan. 21, 2025

(54) SERVICE-AWARE TRAFFIC SESSION TIMERS

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 28 days.

(21) Appl. No.: 18/311,196

(22) Filed: May 2, 2023

(65) Prior Publication Data

US 2023/0269827 A1    Aug. 24, 2023

Related U.S. Application Data

(63) Continuation of application No. 17/365,755, filed on Jul. 1, 2021, now Pat. No. 11,683,854.

(51) Int. Cl.
| | |
|---|---|
| *H04W 76/38* | (2018.01) |
| *H04L 65/1045* | (2022.01) |
| *H04L 65/1066* | (2022.01) |
| *H04L 65/1104* | (2022.01) |
| *H04W 76/19* | (2018.01) |
| *H04W 76/34* | (2018.01) |

(52) U.S. Cl.
CPC ......... *H04W 76/38* (2018.02); *H04L 65/1066* (2013.01); *H04L 65/1104* (2022.05); *H04W 76/19* (2018.02); *H04W 76/34* (2018.02); *H04L 65/1045* (2022.05)

(58) Field of Classification Search
CPC ..... H04W 76/38; H04W 76/19; H04W 76/34; H04W 76/50; H04L 65/1066; H04L 65/1104; H04L 65/1045; H04L 65/1046; H04L 65/1069; H04L 65/1016
See application file for complete search history.

(56) References Cited

U.S. PATENT DOCUMENTS

| | | | | |
|---|---|---|---|---|
| 2010/0088419 A1* | 4/2010 | Phelps | ................. | H04L 65/1069 709/228 |
| 2015/0181033 A1* | 6/2015 | Keller | ................. | H04L 65/1036 455/404.1 |
| 2019/0313229 A1* | 10/2019 | Chiang | ................. | H04W 4/90 |
| 2021/0360040 A1* | 11/2021 | Abdelmalek | ....... | H04L 65/1069 |
| 2022/0337636 A1* | 10/2022 | Han | ................. | H04L 65/1069 |

* cited by examiner

*Primary Examiner* — Charles C Jiang
*Assistant Examiner* — Shawn D Miller
(74) *Attorney, Agent, or Firm* — Foley IP Law, PLLC (57) ABSTRACT

Providing a data traffic session over a wireless network using service-aware traffic session timers includes: receiving, from a user equipment (UE), at a wireless network node, a session message for the data traffic session; based on at least content within the session message, determining a data traffic session type; based on at least the data traffic session type and a stage of the data traffic session, selecting a timer value from a set of timer values, the set of timer values each specific to a type of data traffic session; and based on a timer at the wireless network node reaching the selected timer value, performing a predetermined timer expiration action for the data traffic session. In some examples, the data traffic session type may be a non-emergency voice call, an emergency call, a video call, a wireless customer service call, or a messaging session.

20 Claims, 6 Drawing Sheets

SERVICE-AWARE TRAFFIC SESSION TIMERS

CROSS-REFERENCE TO RELATED APPLICATION

This application is a continuation application of and claims priority to U.S. patent application Ser. No. 17/365,755, entitled "SERVICE-AWARE TRAFFIC SESSION TIMERS," filed on Jul. 1, 2021, the disclosure of which is incorporated herein by reference in its entirety.

BACKGROUND

During setup of a real-time data traffic session (e.g., voice and instant messaging) through an internet protocol (IP) multimedia system (IMS), intermediate network nodes such as call session control functions (CSCFs), hold resources while waiting for responses from nodes further along the path to the destination node (e.g., a called device or a messaging server). In order to avoid holding the resources for too long, a set of timer values is used to control how long various nodes wait prior to attempting a retry and/or declaring a failed setup and releasing the resources. Different timers are used for different phases of the data traffic session setup, with specific timer values.

However, the timers are service-agnostic. That is, there is a common ("one size fits all") set of timer values for all types of data traffic sessions, whether emergency calls, non-emergency voice calls, video calls, and messaging. Thus, network providers provision networks to use the same time-outs for emergency calls, which typically have critical time constraints, as for instant messaging chat sessions, for which users can afford to wait longer without the same degree of anxiety as for an emergency call. For example, during a chat message session, one party may lose coverage and then return to coverage at a later time, possibly without as much perceived disruption as may occur if the same coverage lapse occurred during an emergency voice call. Unfortunately, the common set of timers does not properly fit the span of different practical needs of the range of data traffic session types.

SUMMARY

The following summary is provided to illustrate examples disclosed herein, but is not meant to limit all examples to any particular configuration or sequence of operations.

Providing a data traffic session over a wireless network using service-aware traffic session timers includes: receiving, from a user equipment (UE), at a wireless network node, a session message for the data traffic session; based on at least content within the session message, determining a data traffic session type; based on at least the data traffic session type and a stage of the data traffic session, selecting a timer value from a set of timer values, the set of timer values each specific to a type of data traffic session; and based on a timer at the wireless network node reaching the selected timer value, performing a predetermined timer expiration action for the data traffic session. In some examples, the data traffic session type may be a non-emergency voice call, an emergency call, a video call, a wireless customer service call, or a messaging session. In some examples, the wireless network node may be a call session control function (CSCF), a proxy CSCF (P-CSCF), an emergency CSCF (E-CSCF), an interrogating CSCF (I-CSCF), a serving CSCF (S-CSCF), a telephony application server (TAS) service centralization and continuity (SCC) application server (AS), a rich communication services (RCS) AS, or an interne messaging platform (IMP) server.

BRIEF DESCRIPTION OF THE DRAWINGS

The disclosed examples are described below with reference to the accompanying drawing figures listed below, wherein.

Corresponding reference characters indicate corresponding parts throughout the drawings. References made throughout this disclosure. Relating to specific examples, are provided for illustrative purposes, and are not meant to limit all implementations or to be interpreted as excluding the existence of additional implementations that also incorporate the recited features.

DETAILED DESCRIPTION

Providing a data traffic session over a wireless network using service-aware traffic session timers includes: receiving, from a user equipment (UE), at a wireless network node, a session message for the data traffic session; based on at least content within the session message, determining a data traffic session type; based on at least the data traffic session type and a stage of the data traffic session, selecting a timer value from a set of timer values, the set of timer values each specific to a type of data traffic session; and based on a timer at the wireless network node reaching the selected timer value, performing a predetermined timer expiration action for the data traffic session. In some examples, the data traffic session type may be a non-emergency voice call, an emergency call, a video call, a wireless customer service call, or a messaging session. In some examples, the wireless network node may be a call session control function (CSCF), a proxy CSCF (P-CSCF), an emergency CSCF (E-CSCF), an interrogating CSCF (I-CSCF), a serving CSCF (S-CSCF), a telephony application server (TAS) service centralization and continuity (SCC) application server (AS), a rich communication services (RCS) AS, or an interne messaging platform (IMP) server.

Aspects of the disclosure improve the performance and efficiency of cellular network resource utilization by harmonizing date traffic session timers with date traffic session types (e.g., by using service-aware traffic session timers). This is accomplished by, based on at least a data traffic session type and a stage of the data traffic session, selecting a timer value from a set of timer values, the set of timer values each specific to a type of data traffic session. This solution also improves user experience, by aligning call or messaging session setup and ongoing operation with the varying range practical needs for different uses of cellular devices (e.g., time-critical emergency calls and more relaxed chat messaging or file transfer messaging).

Figure 1:
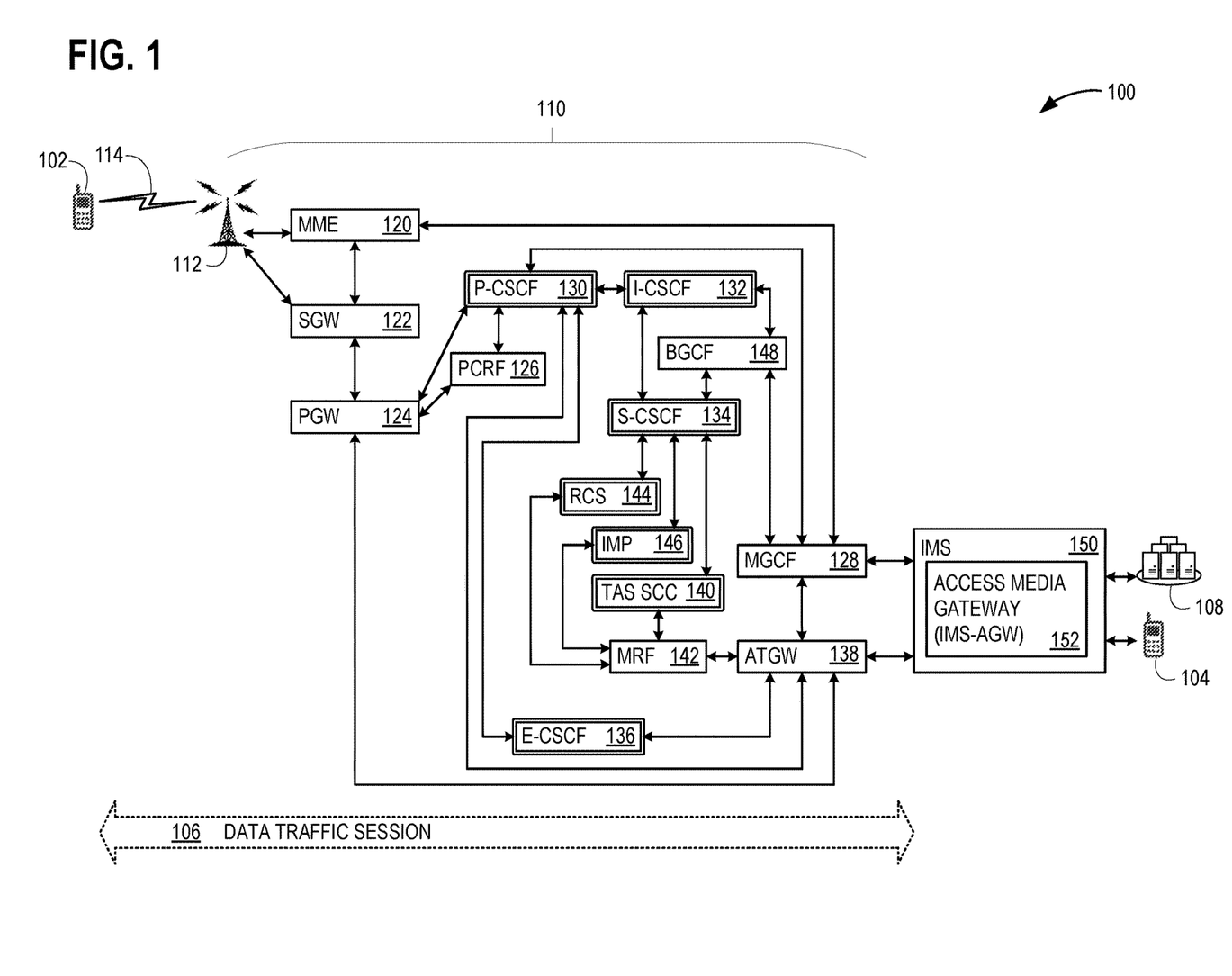
FIG. 1 illustrates an exemplary arrangement that advantageously employs service-aware traffic session timers, in order to improve user experience and more efficiently use network resources.

With reference now to the figures, FIG. 1 illustrates an arrangement 100 that advantageously employs service-aware traffic session timers when providing a data traffic session over a wireless network. In FIG. 1, a UE 102 communicates with a serving base station 112 over an air interface 114, passing through wireless network 110 to an internet protocol (IP) multimedia system (IMS) 150, which has an IMA access media gateway (IMS-AGW) 152. A data traffic session 106 provides real-time communication between UE 102 and a second UE 104 (e.g., a voice call), server across a packet data network (PDN) to a network resource 108. Service-aware traffic session timers disclosed herein are used for setup and maintenance of data traffic session 106. For clarity, in order to prevent FIG. 1 from becoming overly complex, only a subset of nodes of wireless network 110 is illustrated, and is configured as a fourth generation (4G) cellular wireless network. It should be understood that other nodes also exist in wireless network, and the disclosure herein may be used in additional cellular technologies, such as fifth generation (5G) cellular wireless.

A portion of the signaling and data flow across wireless network 110, which is relevant for understanding the operation of service-aware traffic session timers, is described relative to the illustrated nodes of wireless network 110. Serving base station 112 communicates with an access node, illustrated as a mobility management entity (MME) 120, and a serving gateway (SGW) 122, which communicates with a packet data network gateway (PGW) 124. MME 120 is a 4G node, and an equivalent 5G node, an access and mobility management function (AMF), may be used instead. Similarly, SGW 122 and PGW 124 are 4G nodes, whose functionality may be performed in 5G networks using a user plane function (UPF) and a session management function (SMF).

PGW 124 sends data for data traffic session 106 to an access gateway transfer (ATGW) 138 that provides the anchor point for a real-time protocol (RTP) stream passing through IMS 150. PGW 124 sends signaling for data traffic session 106 to a P-CSCF 130, such as session initiation protocol (SIP) messages. PGW 124 and P-CSCF 130 are both in communication with a policy node, shown as a 4G PCRF 126, although a policy control function (PCF) may be used for 5G. Both MME 120 and P-CSCF 130 communicate with a media gateway controller function (MGCF) 128 that acts as a SIP endpoint and controls resources in IMS-AGW 152 using a media gateway control protocol (MGCP).

P-CSCF 130 forwards signaling for data traffic session 106 to an E-CSCF 136 (for emergency calls) or an I-CSCF 132, which forwards the signaling to S-CSCF 134. P-CSCF 130, I-CSCF 132, S-CSCF 134, E-CSCF 136 form a set of CSCFs used in wireless network 110, and are each generalized as a wireless network node 202 in FIG. 2, which provides further detail for service-aware traffic session timers (specifically, service-aware traffic session timer 220). I-CSCF 132 and S-CSCF 134 each communicate with a breakout gateway control function (BCGF) 148, which communicates with MGCF 128.

S-CSCF 134 forwards signaling for telephone data traffic sessions (e.g., voice calls) to a telephony application server (TAS) service centralization and continuity (SCC) application server (AS) 140, and signaling for messaging data traffic sessions to either a rich communication services (RCS) AS 144 or an internet messaging platform (IMP) server 146, depending on the particular messaging service being used. TAS SCC AS 140, RCS AS 144, and IMP server 146 are also generalized as wireless network node 202 in FIG. 2. TAS SCC AS 140, RCS AS 144, and IMP server 146 each communicate with a media resource function (MRF) 142, which also communicates with ATGW 138. Voice calls to other cellular networks may reach those other networks via TAS SCC AS 140.

Figure 2:
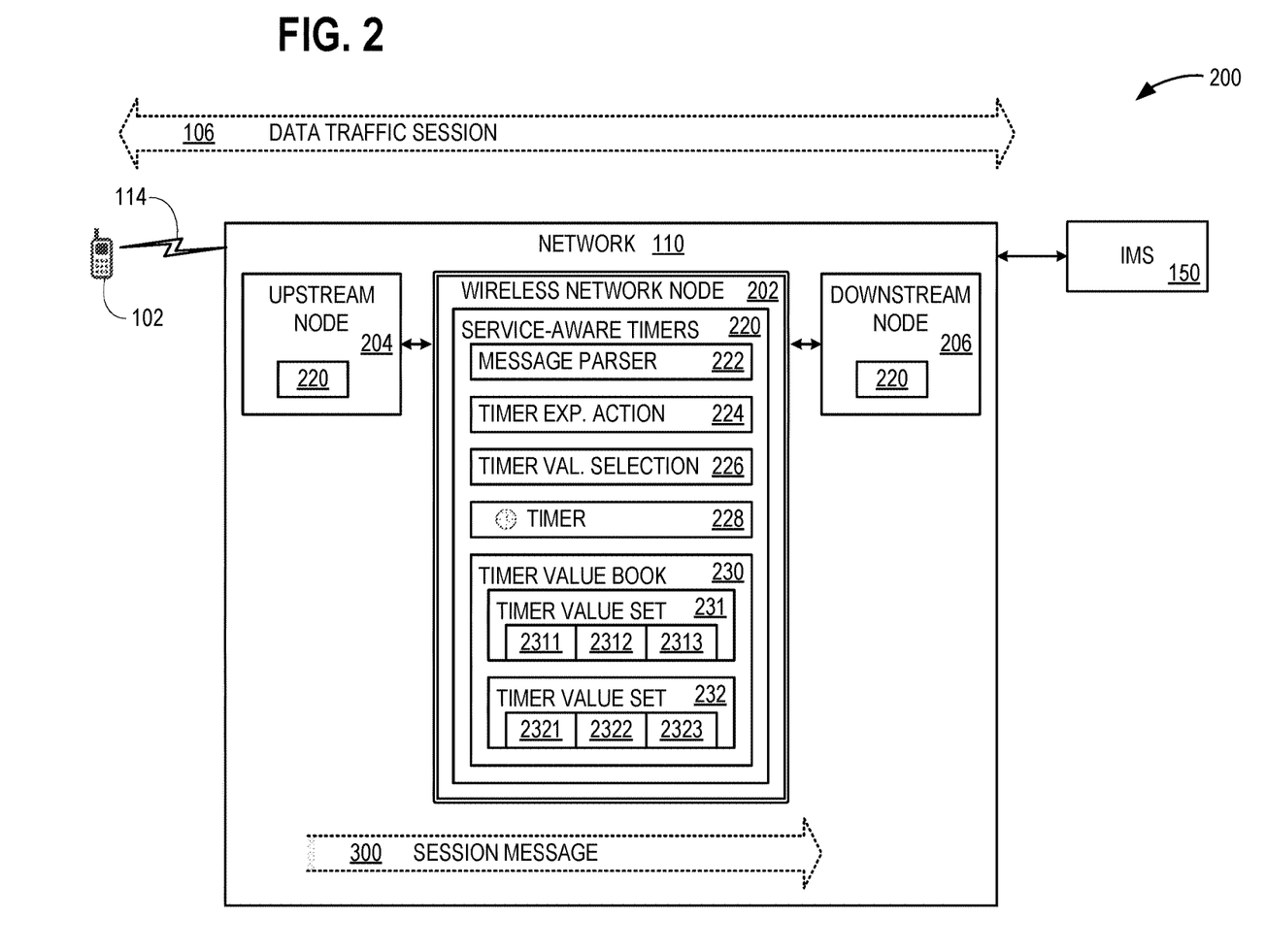
FIG. 2 illustrates additional detail for elements in the arrangement of FIG. 1.

FIG. 2 illustrates a generalized version of arrangement 100 as functional arrangement 200, in which any of P-CSCF 130, I-CSCF 132, S-CSCF 134, E-CSCF 136, TAS SCC AS 140, RCS AS 144, and IMP server 146 are generalized as wireless network node 202 in order to describe the function of service-aware traffic session timer 220. In FIG. 2, wireless network 110 is shown as having an upstream node 204, which is upstream in the signal flow of a session message 300, relative to wireless network node 202. Wireless network 110 also has a downstream node 206, which is downstream in the signal flow of session message 300 relative to wireless network node 202. For example, when wireless network node 202 is P-CSCF 130, upstream node may be PGW 124 and downstream node may be I-CSCF 132, and when wireless network node 202 is TAS SCC AS 140, upstream node may be S-CSCF 134 and downstream node may be MRF 142. As indicated, a manifestation of service-aware traffic session timer 220 may exist within multiple nodes within wireless network 110, to control any timer within that node.

Service-aware traffic session timer 220 has a message parser 222 that parses session message 300 to identify the data traffic session type of data traffic session 106. An example of parsing session message 300 is described in further detail in relation to FIG. 3. A predetermined timer expiration action 224 defines actions to be taken by wireless network node 202 upon expiration of a timer 228 (e.g., timer 228 reaching a selecting a timer value, such as 30 seconds or some other time limit). Examples of predetermined timer expiration action 224 including releasing resources that had been held for data traffic session 106 and returning a failure or time-out message to upstream node 204, and also attempting a retry (e.g., to establish data traffic session 106) with downstream node 206.

Timer value selection 226 selects a timer value from timer value book 230. Timer value book 230 is illustrated as having timer value set 231 and timer value set 232, which are each specific to a type of data traffic session (e.g., emergency call, non-emergency voice, real-time chat messaging, file transfer messaging, customer service automated voice response, or another data traffic session type). Although timer value book 230 is illustrated as having two timer value sets, it should be understood that FIG. 2 is simplified for illustration, and timer value book 230 may have a larger number of timer value sets. Different timer value sets may be used for emergency calls (in general) such as enhanced 911 (E911), emergency calls using 4G, emergency calls using 5G, non-emergency voice calls using voice over long term evolution (VoLTE) in 4G, non-emergency voice calls using voice over new radio (VoNR) in 5G, non-emergency voice calls using voice over evolved packet system fallback (VoEPSFB), non-emergency voice calls using voice over WiFi (VoWiFi), IMS messaging, RCS messaging cellular network, or another date traffic session type.

Timer value set 231 is illustrated as having three timer values, timer value 2311, timer value 2312, and timer value 2313, and timer value set 232 is similarly illustrated as having three timer values, timer value 2321, timer value 2322, and timer value 2323. The various timer values in each of timer value sets 231 and 232 represent timers that are specific to a stage of data traffic session 106 (e.g., a stage of setup, handover, or other event during an ongoing date traffic session). Although timer value book 230 is shown as having two tiers of timer value selection, a timer value set tier (timer value sets 231 and 232) and then a timer value tier (timer values 2311-2313 and 2321-2323), some examples may use only a single-tier set of timer values (represented generally as timer value book 230).

Examples of timers that may be relevant are timers defined for use by third generation partnership project (3GPP) compliant wireless nodes for SIP signaling, such as SIP invite and SIP update messages. European telecommunications standards institute (ETSI) technical specification (TS) 124 229 identifies a list of SIP timers that may be rendered as service-aware traffic session timers 220.

Figure 3:
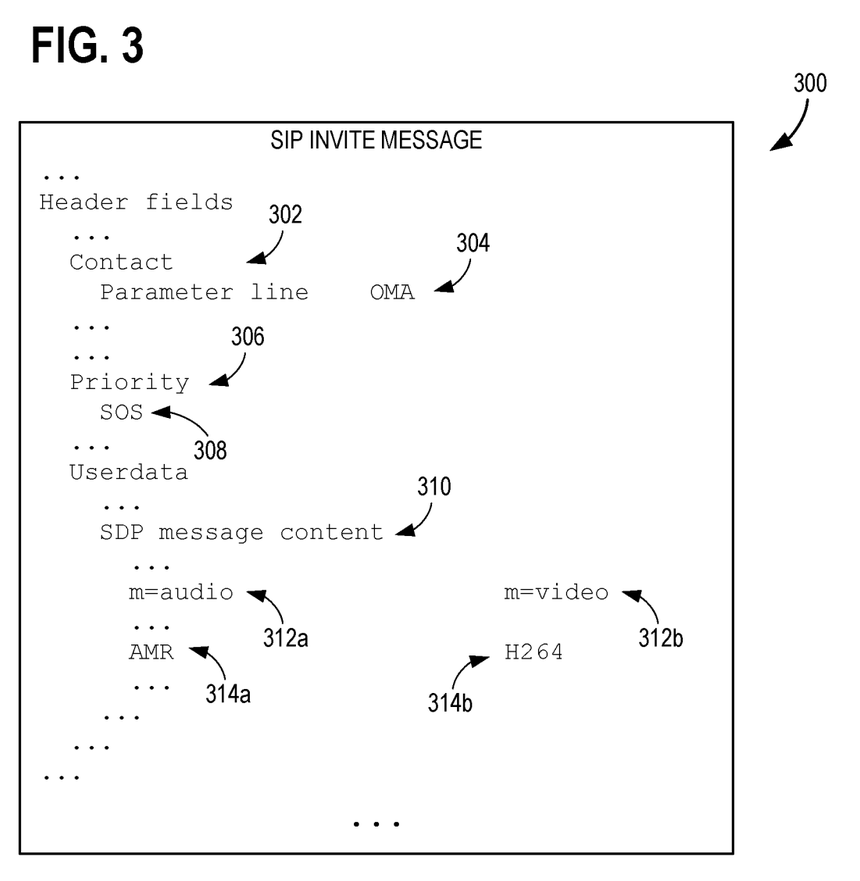
FIG. 3 illustrates examples of information that may be used for determining a data traffic session type in the arrangement of FIG. 1.

FIG. 3 illustrates an example of determining a data traffic session type based on at least content within session message 300. Session message 300 is illustrated as a SIP invite and various header fields, such as a contact header 302, a priority field 306, and a session description protocol (SDP) message content field 310. Other formats may also be used for session message 300, in some examples. Message parser 222 of FIG. 2 extracts the relevant information described below, which is used by timer value selection 226 to select a timer value (e.g., one of timer values 2311-2323) from a set of timer values (e.g., timer value book 230).

As illustrated, contact header 302 has a flag 304 showing OMA, which is and abbreviation of open mobile alliance. An OMA flag indicates a message session, which is not a voice call. Thus, if flag 304 shows OMA, data traffic session 106 is a messaging session. Different content in flag 304 may indicate a different data traffic session type than a messaging session. Also as illustrated, priority field 306 has a flag 308 showing SOS, indicating an emergency call. Different content in flag 308 may indicate a different data traffic session type than an emergency call.

Also as illustrated, SDP message content field 310 has a flag 312a showing m=audio and a flag 314a showing AMR, which is an abbreviation of a voice codec identified as adaptive multi-rate. This indicates a voice call, and other fields may further differentiate a voice call data traffic session type into VoLTE, VoNR, or another voice call type. Alternative flags are also shown in SDP message content field 310 for a video call, specifically, a flag 312b showing m=video and a flag 314b showing H26s, which is a video compression algorithm widely used in cellular applications. It should be understood that FIG. 3 is notional, and it is unlikely that a message would have all of flag 304 showing OMA, flag 308 showing SOS, and flag 312a showing m=audio.

Figure 4:
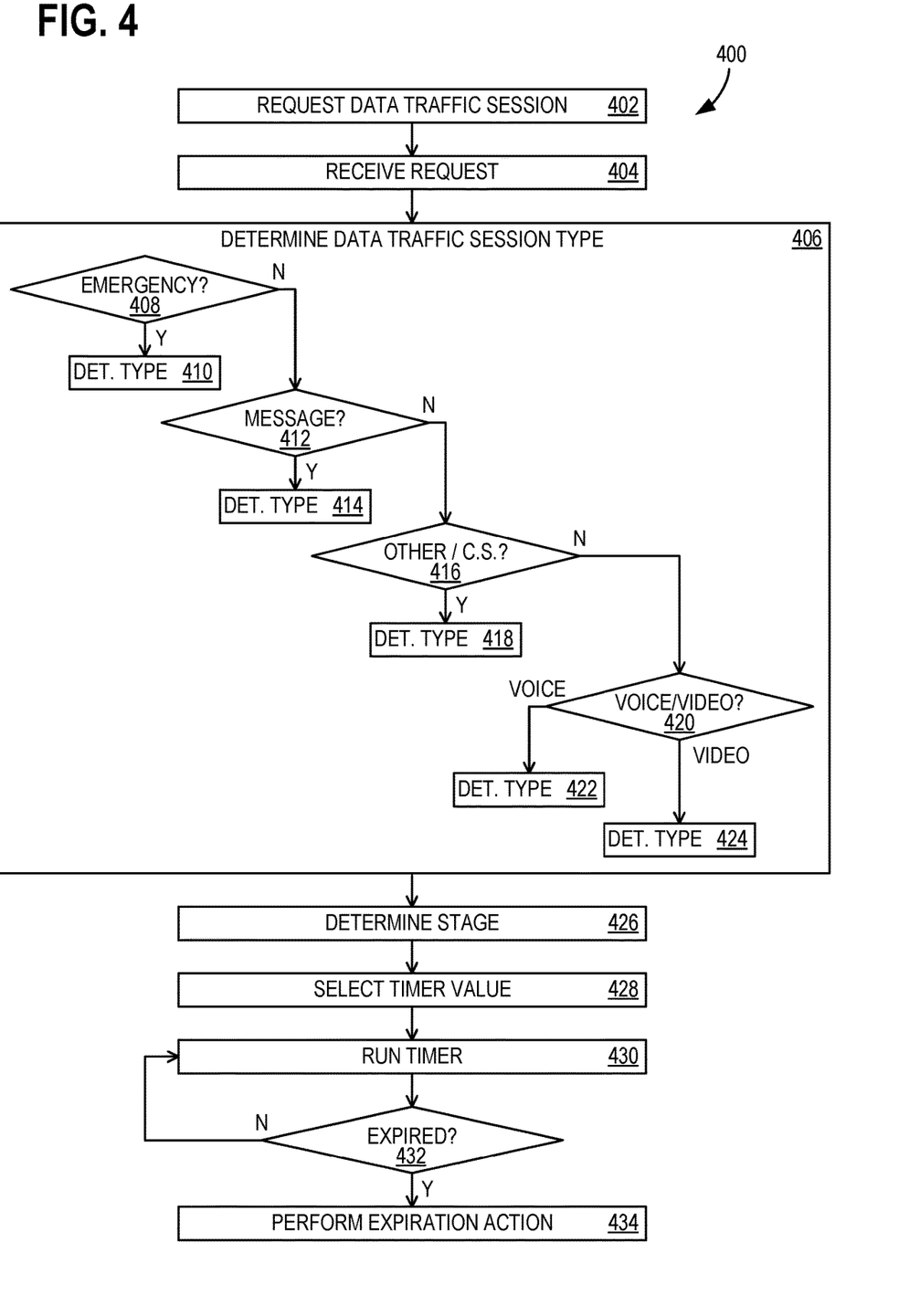
FIG. 4 illustrates a flowchart of exemplary operations associated with the arrangement of FIG. 1.

FIG. 4 illustrates a flowchart 400 of exemplary operations associated with providing data traffic session 106 over wireless network 110 using one or more service-aware traffic session timers 220. In some examples, at least a portion of flowchart 400 may be performed using one or more computing devices 600 of FIG. 6. Flowchart 400 commences with UE 102 forming session message 300 and requesting data traffic session 106 in operation 402. In some examples, the data traffic session type comprises at least one type selected from the list consisting of: a non-emergency voice call, an emergency call, a video call, a wireless customer service call, and a messaging session. In some examples, the non-emergency voice call data traffic session type is further differentiated into a VoLTE type and VoNR type. In some examples, the session message comprises a SIP message, such as a SIP invite message or a SIP update message. In some examples, the messaging session comprises a RCS session, an IMS messaging session, a real-time chat message session, or a file transfer message session. In some examples, the emergency call comprises an E911 call or the wireless customer service call comprises a 611 call.

Operation 404 includes receiving, from UE 102, at wireless network node 202, session message 300 for data traffic session 106. In some examples, wireless network node 202 comprises at least one node selected from the list consisting of: a CSCF, a P-CSCF, an E-CSCF, an I-CSCF, an S-CSCF), a TAS SCC AS, an RCS AS, and IMP server. Operation 406 includes, based on at least content within session message 300, determining a data traffic session type. In some examples, operation 406 is performed using operations 408-424. Decision operation 408 determines whether there is a flag for an emergency call (e.g., flag 308 shows SOS). If so operation 410 determines the emergency call type, such as 4G or 5G. Otherwise, decision operation 412 determines whether there is a flag for a messaging session (e.g., flag 304 shows OMA). If so, operation 414 determines the messaging session type (e.g., RCS, IMS, real-time chat, file transfer). Otherwise, decision operation 416 determines whether there is a flag for another special type of data traffic session, such as a 611 customer service call. If so, operation 418 determines the type.

Otherwise, if data traffic session 106 is a non-emergency voice call or a video call, decision operation 420 determines whether it is a voice call or a video call. For example, a flag may show m=audio or m=video, as described in relation to FIG. 3. If a voice call, operation 422 determines the type, such as VoLTE, VoNR, VoEPS, VoWiFi, or perhaps another. If a video call, operation 424 determines the type. In some examples, determining the data traffic session type comprises identifying a first flag indicating data traffic session type, and/or identifying a second flag indicating data traffic session type. In some examples, the flags comprise a textual identification of the session type of data traffic session 106. Operation 426 determines the stage of data traffic session 106, such as setup or ongoing and, in some examples, at which node session message 300 has progressed through wireless network 110.

Operation 428 includes, based on at least data traffic session type and a stage of data traffic session 106, selecting a timer value from a set of timer values (e.g., timer value book 230), the set of timer values each specific to a type of data traffic session. In some examples, this comprises dynamically updating SIP timer values. Timer 228 begins running when flowchart 400 reaches operation 430, and decision operation 432 determines whether timer 228 has expired (e.g., reached the value of the selected timer value from operation 428). If timer 228 has not yet expired, flowchart returns to operation 430 to continue running timer 228.

When timer 228 expires, operation 434 includes, based on timer 228 at wireless network node 202 reaching the selected timer value, performing predetermined timer expiration action 224 for data traffic session 106. In some examples, predetermined timer expiration action 224 for data traffic session 106 comprises sending a failure message to UE 102 or attempting a retry for data traffic session 106.

Figure 5:
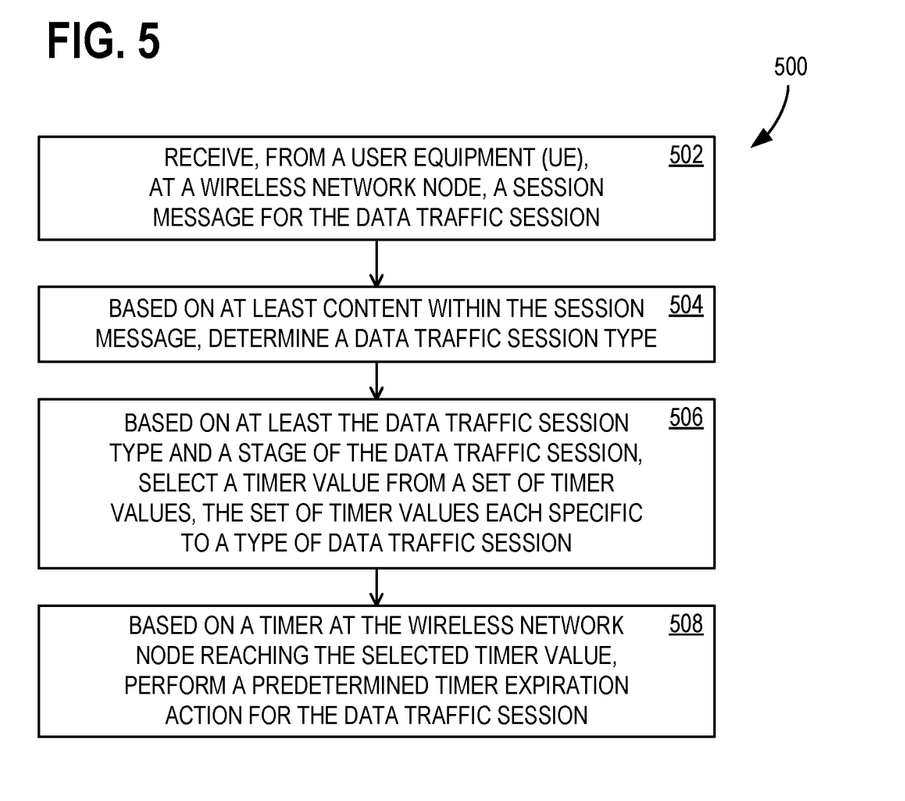
FIG. 5 illustrates another flowchart of exemplary operations associated with the arrangement of FIG. 1.

FIG. 5 illustrates a flowchart 500 of exemplary operations associated with examples of arrangement 100. In some examples, at least a portion of flowchart 500 may be performed using one or more computing devices 600 of FIG. 6. Flowchart 500 commences with operation 502, which includes receiving, from a UE, at a wireless network node, a session message for the data traffic session. Operation 504 includes, based on at least content within the session message, determining a data traffic session type. Operation 506 includes, based on at least the data traffic session type and a stage of the data traffic session, selecting a timer value from a set of timer values, the set of timer values each specific to a type of data traffic session. Operation 508 includes, based on a timer at the wireless network node reaching the selected timer value, performing a predetermined timer expiration action for the data traffic session.

Figure 6:
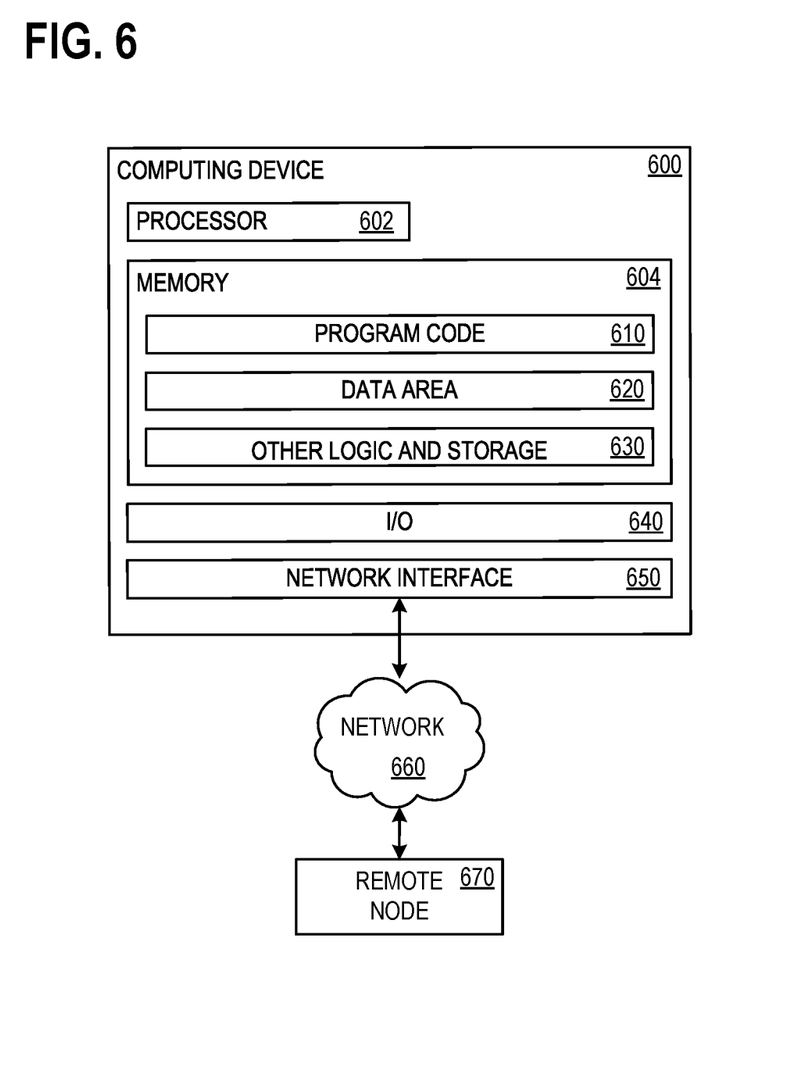
FIG. 6 illustrates a block diagram of a computing device suitable for implementing various aspects of the disclosure.

FIG. 6 illustrates a block diagram of computing device 600 that may be used as any component described herein that may require computational or storage capacity. Computing device 600 has at least a processor 602 and a memory 604 that holds program code 610, data area 620, and other logic and storage 630. Memory 604 is any device allowing information, such as computer executable instructions and/or other data, to be stored and retrieved. For example, memory 604 may include one or more random access memory (RAM) modules, flash memory modules, hard disks, solid-state disks, persistent memory devices, and/or optical disks. Program code 610 comprises computer executable instructions and computer executable components including any instructions necessary to perform operations described herein. Data area 620 holds any data necessary to perform operations described herein. Memory 604 also includes other logic and storage 630 that performs or facilitates other functions disclosed herein or otherwise required of computing device 600. An input/output (I/O) component 640 facilitates receiving input from users and other devices and generating displays for users and outputs for other devices. A network interface 650 permits communication over a network 660 with a remote node 670, which may represent another implementation of computing device 600. For example, a remote node 670 may represent another of the above-noted nodes within arrangement 100.

ADDITIONAL EXAMPLES

An example method of providing a data traffic session over a wireless network comprises: receiving, from a UE, at a wireless network node, a session message for the data traffic session; based on at least content within the session message, determining a data traffic session type; based on at least the data traffic session type and a stage of the data traffic session, selecting a timer value from a set of timer values, the set of timer values each specific to a type of data traffic session; and based on a timer at the wireless network node reaching the selected timer value, performing a predetermined timer expiration action for the data traffic session.

An example system for providing a data traffic session over a wireless network comprises: a processor; and a computer-readable medium storing instructions that are operative upon execution by the processor to: receive, from a UE, at a wireless network node, a session message for the data traffic session; based on at least content within the session message, determine a data traffic session type; based on at least the data traffic session type and a stage of the data traffic session, select a timer value from a set of timer values, the set of timer values each specific to a type of data traffic session; and based on a timer at the wireless network node reaching the selected timer value, perform a predetermined timer expiration action for the data traffic session.

One or more example computer storage devices has computer-executable instructions stored thereon, which, upon execution by a computer, cause the computer to perform operations comprising: receiving, from a UE, at a wireless network node, a session message for a data traffic session; based on at least content within the session message, determining a data traffic session type; based on at least the data traffic session type and a stage of the data traffic session, selecting a timer value from a set of timer values, the set of timer values each specific to a type of data traffic session; and based on a timer at the wireless network node reaching the selected timer value, performing a predetermined timer expiration action for the data traffic session.

Alternatively, or in addition to the other examples described herein, examples include any combination of the following:

- the data traffic session type comprises at least one type selected from the list consisting of: a non-emergency voice call, an emergency call, a video call, a wireless customer service call, and a messaging session;
- determining the data traffic session type comprises identifying a first flag indicating the data traffic session type;
- determining the data traffic session type further comprises identifying a second flag indicating the data traffic session type;
- the predetermined timer expiration action for the data traffic session comprises sending a failure message to the UE or attempting a retry for the data traffic session;
- the wireless network node comprises at least one node selected from the list consisting of: a CSCF, a P-CSCF, an E-CSCF, an I-CSCF, a S-CSCF, a TAS SCC AS, an RCS AS, and an IMP server;
- the session message comprises a SIP message;
- the non-emergency voice call data traffic session type is further differentiated into a non-emergency VoLTE type and a non-emergency VoNR type;
- the messaging session comprises an RCS session;
- the messaging session comprises an IMS messaging session;
- the messaging session comprises a real-time chat session;
- the messaging session comprises a file transfer;
- the emergency call comprises an E911 call;
- the wireless customer service call comprises a 611 call;
- the session message comprises a SIP invite message;
- the session message comprises a SIP update message;
- the first flag comprises a textual identification of the session type of the data traffic session;
- the first flag comprises SOS in a SIP message header, indicating an emergency call;
- the first flag comprises OMA in a SIP message header, indicating a messaging session;
- the second flag comprises a textual identification of the session type of the data traffic session;
- the second flag comprises m=voice, indicating a voice call; and
- the second flag comprises m=video, indicating a video call.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of providing a data traffic session over a wireless network, the method comprising:
   receiving, from a first user equipment (UE), at a wireless network node, a first session message for a first data traffic session;
   determining a first data traffic session type based on content within the first session message;
   determining a first stage of the first data traffic session, the first stage selected from the list consisting of: a setup stage, an ongoing stage, and a handover stage;
   selecting a first timer value from a set of timer values based on the determined first data traffic session type and the determined first stage of the first data traffic session, wherein the set of timer values includes a setup stage timer value, an ongoing stage timer value, and a handover stage timer value; and
   performing a first predetermined timer expiration action for the first data traffic session based on a timer at the wireless network node reaching the selected first timer value.

2. The method of claim 1, wherein the first data traffic session type comprises at least one type selected from the list consisting of:
   a non-emergency voice call, an emergency call, a video call, a wireless customer service call, and a messaging session.

3. The method of claim 1, wherein determining the first data traffic session type comprises identifying a first flag indicating the first data traffic session type is either an emergency call or a non-emergency call, and wherein determining the data traffic session type further comprises identifying a second flag indicating the data traffic session type is a messaging type session, a voice call, or a video call.

4. The method of claim 1 further comprising:
   receiving, from a second UE, at the wireless network node, a second session message for a second data traffic session;
   determining a second data traffic session type based on content within the second session message;
   determining a second stage of the second data traffic session, the second stage selected from the list consisting of: a setup stage, an ongoing stage, and a handover stage;
   selecting a second timer value from the set of timer values based on the determined second data traffic session type and the determined second stage of the second data traffic session, wherein the second stage of the second data traffic session differs from the first stage of the first data traffic session; and
   performing a second predetermined timer expiration action for the second data traffic session based on a timer at the wireless network node reaching the selected second timer value.

5. The method of claim 1, wherein the first predetermined timer expiration action for the first data traffic session comprises sending a failure message to the UE or attempting a retry for the first data traffic session.

6. The method of claim 1, wherein the wireless network node comprises at least one node selected from the list consisting of:
   a call session control function (CSCF), a proxy CSCF (P-CSCF), an emergency CSCF (E-CSCF), an interrogating CSCF (I-CSCF), a serving CSCF (S-CSCF), a telephony application server (TAS) service centralization and continuity (SCC) application server (AS), a rich communication services (RCS) AS, and an internet messaging platform (IMP) server.

7. The method of claim 1, wherein each timer value in the set of timer values is specific to an individual type of data traffic session.

8. A system for providing a data traffic session over a wireless network, the system comprising:
   a processor; and
   a computer-readable medium storing instructions that are operative upon execution by the processor to:
      receive, from a first user equipment (UE), at a wireless network node, a session message for a first data traffic session;
      determine a first data traffic session type using content of the first session message;
      determine a first stage of the first data traffic session, the first stage selected from the list consisting of: a setup stage, an ongoing stage, and a handover stage;
      select a first timer value from a set of timer values based on the determined first data traffic session type and the determined first stage of the first data traffic session, wherein the set of timer values includes a setup stage timer value, an ongoing stage timer value, and a handover stage timer value; and
      based on a timer at the wireless network node reaching the selected first timer value, perform a first predetermined timer expiration action for the first data traffic session.

9. The system of claim 8, wherein the first data traffic session type comprises at least one type selected from the list consisting of:
   a non-emergency voice call, an emergency call, a video call, a wireless customer service call, and a messaging session.

10. The system of claim 9, wherein the non-emergency voice call data traffic session type is further differentiated into a non-emergency voice over long term evolution (VOLTE) type and a non-emergency voice over new radio (VoNR) type.

11. The system of claim 8, wherein determining the first data traffic session type comprises identifying a first flag indicating the data traffic session type is either an emergency call or a non-emergency call.

12. The system of claim 11, wherein determining the first data traffic session type further comprises identifying a second flag indicating the data traffic session type is a message type session, a voice call, or a video call.

13. The system of claim 8, wherein the first predetermined timer expiration action for the data traffic session comprises sending a failure message to the UE or attempting a retry for the data traffic session.

14. The system of claim 8, wherein the wireless network node comprises at least one node selected from the list consisting of:

a call session control function (CSCF), a proxy CSCF (P-CSCF), an emergency CSCF (E-CSCF), an interrogating CSCF (I-CSCF), a serving CSCF (S-CSCF), a telephony application server (TAS) service centralization and continuity (SCC) application server (AS), a rich communication services (RCS) AS, and an internet messaging platform (IMP) server.

15. One or more computer storage devices having computer-executable instructions stored thereon, which, upon execution by a computer, cause the computer to perform operations comprising:

receiving, from a first user equipment (UE), at a wireless network node, a first session message for a first data traffic session;

determining a first data traffic session type using content of the received first session message;

determining a first stage of the first data traffic session, the first stage selected from the list consisting of: a setup stage, an ongoing stage, and a handover stage;

selecting a first timer value from a set of timer values based on the determined first data traffic session type and the determined first stage of the first data traffic session, wherein the set of timer values includes a setup stage timer value, an ongoing stage timer value, and a handover stage timer value; and performing a first predetermined timer expiration action for the first data traffic session based on a timer at the wireless network node reaching the selected first timer value.

16. The one or more computer storage devices of claim 15, wherein the first data traffic session type comprises at least one type selected from the list consisting of:

a non-emergency voice call, an emergency call, a video call, a wireless customer service call, and a messaging session.

17. The one or more computer storage devices of claim 15, wherein determining the first data traffic session type comprises identifying a first flag indicating the data traffic session type is either an emergency call or a non-emergency call.

18. The one or more computer storage devices of claim 17, wherein determining the first data traffic session type further comprises identifying a second flag indicating the data traffic session type is a messaging session, a voice call, or a video call.

19. The one or more computer storage devices of claim 15, wherein the first predetermined timer expiration action for the data traffic session comprises sending a failure message to the UE or attempting a retry for the data traffic session.

20. The one or more computer storage devices of claim 15, wherein the wireless network node comprises at least one node selected from the list consisting of:

a call session control function (CSCF), a proxy CSCF (P-CSCF), an emergency CSCF (E-CSCF), an interrogating CSCF (I-CSCF), a serving CSCF (S-CSCF), a telephony application server (TAS) service centralization and continuity (SCC) application server (AS), a rich communication services (RCS) AS, and an internet messaging platform (IMP) server.

\* \* \* \* \*